(12) United States Patent
Eberle et al.

(10) Patent No.: US 12,071,565 B2
(45) Date of Patent: Aug. 27, 2024

(54) DISPLAY DEVICE, PRODUCTION AND USE THEREOF

(71) Applicant: MERCK PATENT GMBH, Darmstadt (DE)

(72) Inventors: Sabine Eberle, Bickenbach (DE); Udo Gumsheimer, Weisenheim A.S. (DE)

(73) Assignee: MERCK PATENT GMBH, Darmstadt (DE)

( * ) Notice: Subject to any disclaimer, the term of this patent is extended or adjusted under 35 U.S.C. 154(b) by 718 days.

(21) Appl. No.: 17/261,456

(22) PCT Filed: Jul. 17, 2019

(86) PCT No.: PCT/EP2019/069177
§ 371 (c)(1),
(2) Date: Jan. 19, 2021

(87) PCT Pub. No.: WO2020/016263
PCT Pub. Date: Jan. 23, 2020

(65) Prior Publication Data
US 2021/0163763 A1  Jun. 3, 2021

(30) Foreign Application Priority Data

Jul. 20, 2018 (EP) ..................... 18184707

(51) Int. Cl.
*C09D 5/36* (2006.01)
*C09D 7/40* (2018.01)
*C09D 7/62* (2018.01)

(52) U.S. Cl.
CPC ............ *C09D 5/36* (2013.01); *C09D 7/62* (2018.01); *C09D 7/70* (2018.01)

(58) Field of Classification Search
None
See application file for complete search history.

(56) References Cited

U.S. PATENT DOCUMENTS

| | | |
|---|---|---|
| 6,158,156 A | 12/2000 | Patrick |
| 7,350,949 B2 | 4/2008 | Meinke et al. |
| 7,985,008 B2 | 7/2011 | Kaisser et al. |
| 8,113,695 B2 | 2/2012 | Meinke et al. |
| 8,378,267 B2 | 2/2013 | Striegler |

(Continued)

FOREIGN PATENT DOCUMENTS

| | | |
|---|---|---|
| DE | 69604502 T2 | 5/2000 |
| DE | 102005047500 A1 | 4/2007 |

(Continued)

OTHER PUBLICATIONS

International Search Report PCT/EP2019/069177 dated dated Nov. 7, 2019 (pp. 1-2).

*Primary Examiner* — Ashok Patel
(74) *Attorney, Agent, or Firm* — MILLEN, WHITE, ZELANO & BRANIGAN, P.C.; Csaba Henter (57) ABSTRACT

The present invention relates to a display device, in particular a backlit display device having a visible side and a back side, which appears opaque in colour and texture on viewing of the visible side without backlighting, but, with the backlighting switched on, is sufficiently transparent that the transmission of information by the light source from the back side is possible, and to the production of a display device of this type and to the use thereof.

26 Claims, 3 Drawing Sheets

(56) References Cited

U.S. PATENT DOCUMENTS

| | | |
|---|---|---|
| 8,740,388 B2 | 6/2014 | Okuda et al. |
| 9,642,212 B1 | 5/2017 | Rogers et al. |
| 9,751,461 B2 | 9/2017 | Vourlat |
| 9,925,917 B2 | 3/2018 | Salter et al. |
| 10,293,761 B2 | 5/2019 | Topart et al. |
| 2004/0021961 A1 | 2/2004 | Munro |
| 2011/0056815 A1 | 3/2011 | Lust et al. |
| 2012/0313392 A1 | 12/2012 | Bingle |
| 2013/0026504 A1 | 1/2013 | Marx et al. |
| 2017/0182932 A1 | 6/2017 | Münker et al. |

FOREIGN PATENT DOCUMENTS

| | | |
|---|---|---|
| DE | 102012003412 A1 | 8/2013 |
| DE | 102015100992 A1 | 7/2015 |
| DE | 102016201475 A1 | 8/2016 |
| DE | 202017103175 U1 | 8/2017 |
| EP | 0858647 B1 | 9/1999 |
| EP | 1688308 A2 | 8/2006 |
| EP | 1344688 B1 | 11/2012 |
| EP | 1772667 B1 | 12/2014 |
| EP | 3305498 A1 | 4/2018 |
| EP | 3184371 B1 | 1/2019 |
| EP | 3315361 B1 | 7/2019 |
| EP | 2223900 B1 | 12/2020 |
| EP | 3184886 B1 | 1/2021 |
| JP | 5185444 A | 7/1993 |
| JP | 2004101712 A | 4/2004 |
| JP | 2015006819 A | 1/2015 |
| KR | 101649966 B1 | 8/2016 |
| WO | 08034611 A1 | 3/2008 |
| WO | 2012031837 * | 3/2012 |
| WO | 18086726 A1 | 5/2018 |

* cited by examiner

Fig 1:

Spectrum of Pyrisma Turquoise SW

Fig 2:

Emission spectrum of a blue OLED

Fig 3:

DISPLAY DEVICE, PRODUCTION AND USE THEREOF

The present invention relates to a display device, in particular a backlit display device having a visible side and a back side, which appears opaque in colour and texture on viewing of the visible side without backlighting, but, with the backlighting switched on, is sufficiently transparent that the transmission of information by the light source from the back side is possible. With the backlighting switched off, the display device is preferably integrated into its environment in such a way that it is not visually perceptible as such. The invention furthermore relates to the production of a display device of this type and to the use thereof.

Backlit display devices are known per se. Thus, a light source provided with a mask and a transparent coating arranged thereon can impart information specified by the mask visibly to the outside with the light source switched on, for example in the form of fixed logos or characters. However, if the transparent coating is colourless or of a pale colour and virtually completely transparent to light, the mask and consequently the information to be imparted can be perceived from the outside, even with the backlighting switched off. This is undoubtedly desired in the case of illuminated advertising signs and similar display devices, but may be regarded as objectionable in many areas of application. In addition, the information to be imparted is fixed and can only be varied by replacing the mask.

There has therefore been no lack of attempts to provide display devices which adapt their outer appearance to their environment as well as possible and only allow the desired information to become visible with the backlighting switched on. Such display devices are very interesting, in particular, for the interior and exterior equipment of motor vehicles, but can also be used in many electrical or electronic devices or household products.

Many automobiles, in particular for private use, but also various electronic or household products, have for some time been provided with coatings containing effect pigments which provide these products with an impression of high value. These can be metallic paints or paints with pearlescent effects. While metallic paints contain finely divided metal pigments which reflect light strongly, but also have a high degree of hiding power, effect paints, which are pigmented exclusively with pearlescent pigments, are often transparent and therefore have virtually no opacity. The production of coatings on light sources which are sufficiently opaque when viewed from the front, but have sufficient transmission with backlighting is therefore not possible using only metal pigments on the one hand or only pearlescent pigments on the other hand.

DE 1 0201 200341 2 A1 discloses a backlit plastic moulding having a visible surface with a metallic appearance, which comprises a translucent foil having a visible surface with a metallic appearance which is provided with a transparent or translucent backing of a plastic composition by injection moulding or casting. A screen-printed layer between the foil and the plastic composition serves as mask, which determines the transmittance of the foil with the backlighting switched on. A light source is arranged on the foil side facing away from the screen-printed layer. The foil having a visible surface with a metallic appearance can be a foil which has a metallic surface layer applied by the PVD process. Mouldings of this type imitate the appearance of chrome-plated vehicle parts with the backlighting switched off, i.e. can only be employed on exposed areas of the vehicle and differ significantly in visual terms from the usual vehicle paint. In addition, the screen-printed layer permanently determines the type of information that can be imparted and in this respect does not allow any variation.

DE 102005047500 A1 discloses a plastic component having a visible part and a light source, where the visible part is formed in one layer from a transparent plastic moulding composition and contains admixed effect pigments. It is claimed that the injection-moulded visible part corresponds very substantially to the surface appearance of the object surrounding the visible part when the light source is inactive, but appears translucent with backlighting. Effect pigments which can be employed are said to be metal particles, aluminium/bronze powders, aluminium flakes or interference pigments. It is not stated here how the desired opacity and transparency can be established with the quite different effect pigments, since metal pigments and interference pigments, as described above, exhibit contrary effects with respect to their hiding power. In addition, the consumption of effect pigments on use in injection mouldings is high and matching to the optical appearance of the later environment of the plastic component must take place before its production, which may be difficult, in particular with respect to the colour design and opacity.

EP 1344688 B1 claims a motor vehicle component which has a plate having a front and back and is claimed to have an opaque appearance when viewed from the front without backlighting, but has transparent part-areas with backlighting. The plate has a multilayered composition and has a substrate, an at least partly transparent layer, a layer having selected regions of opacity and/or colour contrasts, a layer which is opaque in daylight, and a layer which provides protection against UV light. The at least partly transparent layer may contain mica-based interference pigments. The layer structure described here is complex and requires several substrate coating operations. Since the opacity of the vehicle component is generated via the layer which is opaque in daylight, the optical influence of the interference pigments is not clear. Likewise in this vehicle component, the information to be transmitted is unchangeably fixed via the layer having selected regions of opacity and colour contrasts functioning as mask. In addition, the component has to be manufactured in advance, meaning that matching of hue, texture and opacity to its future environment in the vehicle may, as already described above, prove to be extremely difficult.

There is therefore a need for backlit display devices which appear opaque when the backlighting is inactive and transparent to light when the backlighting is active and can be incorporated in a simple manner into components of various objects to be provided with effect paints, where the information to be rendered visible should preferably be variably adjustable.

The object of the present invention therefore consists in providing a backlit display device which has a coating which comprises interference pigments as effect pigments and can optionally be applied as joint coating with an object even after insertion of the display device into the object, where the coating is substantially opaque when the backlighting is inactive and substantially transparent when the backlighting is active, and where the display device can when needed render variable information visible.

A further object of the invention consists in proposing a process for the production of a display device of this type.

In addition, an object of the invention consists in indicating the use of a display device of this type.

The object of the present invention is achieved by a display device which has a transparent substrate which has a visible side and a back side, where a coating is located on the visible side of the transparent substrate and a light source is present which is integrated into the transparent substrate or arranged on the back of the transparent substrate, where the coating comprises at least one transparent binder, at least one colourless, transparent, flake-form interference pigment and at least one absorption pigment and optionally further additives, and where the coating, when applied over the entire area to a black/white background in a layer thickness of 14±2 µm and measured spectrophotometrically at an illumination angle of 45° and at a viewing angle of 75°, has a colour separation ΔE* between the coated black background and the coated white background in the range from 3 to 35.

The object of the invention is furthermore also achieved by a process for the production of a display device, in which a surface which forms a visible side of a transparent substrate, where a light source is optionally integrated into the substrate and where the surface has optionally been pre-coated with a masking layer which is partly transparent to light and partly opaque to light, is coated with a coating composition which comprises at least one transparent binder, at least one colourless, transparent, flake-form interference pigment, at least one absorption pigment and optionally further additives, where interference pigment(s) and absorption pigment(s) are present in the coating composition in a ratio of 1:1 to 10:1, the coating composition is subsequently solidified and, in the case where the substrate does not contain a light source, a light source is arranged on the back of the transparent substrate.

The object of the invention is furthermore also achieved by the use of the display device described above as static or variable, backlit information display for internal and/or external components of motor vehicles, for domestic appliances, electronic devices, architectural elements, advertising areas, information boards, direction signs, furniture, decoration elements for the internal and external design of buildings or for objects of art.

In a first, simplest embodiment, the display device according to the invention consists of a light source, which has a surface layer which is transparent for the wavelength range of the light emitted by this light source and a coating located on this transparent surface layer. At the same time, the transparent surface layer of the light source represents the transparent substrate of the display device. The coating located thereon comprises at least one transparent binder, at least one colourless, transparent, flake-form interference pigment and at least one absorption pigment and optionally further additives and is in solid form on the transparent substrate. The coating is preferably located over the entire area of the transparent surface layer of the light source. The specific composition of the coating is applicable to all embodiments of the display device according to the invention and is described below. The light source can be, for example, an incandescent lamp, a fluorescent lamp, an LED, an OLED or a group of in each case a plurality of these light sources, or alternatively a display or a group of displays of electronic devices.

In a second embodiment of the present invention, the display device consists of a transparent substrate, which can be a plastic film, a plastic body, a glass sheet, a glass body or another, preferably two-dimensional, light-transparent substrate, to one surface of which, which represents the visible side of the display device, a coating which comprises at least one transparent binder, at least one colourless, transparent, flake-form interference pigment and at least one absorption pigment and optionally further additives and is in solid form on the transparent substrate, has been applied directly. This coating is preferably present over the entire area of the visible side of the light-transparent substrate. A light source which emits light in a wavelength range for which the light-transparent substrate is completely or substantially transparent is arranged on the surface of the transparent substrate (back) facing away from the visible side. This light is preferably visible light in a wavelength range from 400 to 780 nm. Light sources which come into consideration here are virtually all suitable light sources, for example incandescent lamps, cold-light lamps, warm-light lamps, fibre-optical systems, fluorescent lamps, energy-saving lamps, LEDs, OLEDs, OLECs, displays of electronic devices, etc., which are in each case arranged individually or in groups on the back of the transparent substrate.

In a third embodiment, the surface of the two-dimensional, light-transparent substrate which represents the visible side of the display device is only provided on a first part-area with a coating which comprises at least one transparent binder, at least one colourless, transparent, flake-form interference pigment and at least one absorption pigment and optionally further additives and is in solid form on the transparent substrate. This first part-area has a shape which itself represents information or is suitable for the transmission of information, for example in the form of alphanumeric characters, symbols, abstract objects, etc. This first part-area can consist of a plurality of sections separated from one another, for example in the form of lettering with letters separated from one another. The first part-area is supplemented by a second part-area, which, together with the first part-area, forms the entire surface of the two-dimensional, light-transparent substrate which represents the visible side of the display device. The second surface here is provided with a layer which is opaque to light, which thus takes on the function of a masking layer.

A fourth embodiment of the display device according to the invention essentially corresponds to the first embodiment, with the difference that at least one masking layer which has part-areas of different transmittance for the light emitted by the light source is additionally located between the transparent surface of the light source and the coating comprising at least one interference pigment. Higher light transmittance is in each case achieved here by corresponding part-areas of the masking layer which either represent local gaps in the masking layer (complete light transmittance) or have a lower layer thickness or a lower concentration of light-absorbent ingredients (relatively high light transmittance) than the part-areas of the masking layer of lower light transmittance. The latter, due to a high layer thickness and/or a high concentration of light-absorbent ingredients, totally opaque to light or at least have higher light opacity than the part-areas of higher light transmittance. The part-areas of higher light transmittance can be present in the masking layer, for example, in the form of characters, lettering, symbols, graphics, regular or irregular patterns, etc. If a masking layer of this type is present, the number, position and shape of the part-areas of higher light transmittance determine the type of information that is perceptible on the visible side with the light source switched on. Masking layers can be applied to the surface of the transparent surface layer of the light source, for example in the form of absorbent films, as absorbent paint, absorbent coating or absorbent vapour-deposited layer. Suitable light-absorbent ingredients of the masking layer are, in particular, carbon blacks and other carbon modifications, but also other strongly light-absorbent materials, in particular in the form of conventional absorption pigments. In addition, strongly reflecting materials, for example in the form of vapour-deposited metal layers or applied metal foils, which usually have gaps as part-areas of higher light transmittance, can also be employed in the masking layer. However, it must be noted that a masking layer of this type fixes the type of information that can be transmitted by the display device as early as during production of the display device. If variable information is to be imparted, a masking layer is not employed.

In the case of the fifth and sixth embodiments of the display device according to the invention, the second embodiment is modified in that either firstly a masking layer described above is applied to the surface of the light-transparent substrate which represents the visible side of the display device, and the coating comprising interference pigments is only then applied to this masking layer (fourth embodiment), or in that a masking layer is located between the light source and the back of the transparent substrate (fifth embodiment). The corresponding masking layers can have a structure as described above. If the transmission of variable information by means of the display device is desired or necessary, masking layers are not employed. The first and second embodiments of the display device according to the invention are therefore preferred as soon as it is intended to be able to transmit variable information.

For all the embodiments described above, the coating on the visible side of the transparent substrate comprises at least one transparent binder, at least one colourless, transparent, flake-form interference pigment and at least one absorption pigment, and may optionally also comprise further additives. In order to be able to set the desired transmission and opacity properties of the coating in an optimum range for the display device, it is necessary for the coating to comprise no further colouring ingredients besides the interference pigment(s) and the absorption pigment(s). Any further additives present must be selected in accordance with this prerequisite.

The colourless, transparent, flake-form interference pigments are effect pigments which are able to generate interference colours in applications, have no mass tone and appear colourless as pigment powder.

The specific type of transparent flake-form interference pigments or optionally mixtures of various of these interference pigments is determined by the desired colouring of the display device according to the invention, which preferably optimally matches the colouring of the respective object into which the display device is to be installed later, if such an installation is intended. In addition, the optical interaction with the absorption pigment(s) likewise present in the coating must also be noted. In particular cases, the wavelength range emitted by the respective light source also plays a role in the selection of the interference pigments, as described below.

Flake-form effect pigments which can be employed in the coating integrated into the display device according to the invention are colourless interference pigments which are built up from a layer or a plurality of layers of different materials and are in flake form.

Pigments or support materials are referred to as flake-form if their outer shape corresponds to a two-dimensional structure which, with its top and bottom sides, has two surfaces which are approximately parallel to one another, whose length and width dimensions represent the largest dimension of the pigment or support material and is also referred to as particle size. By contrast, the separation between the said surfaces, which represents the thickness of the flake, has a smaller dimension.

These pigments preferably have a transparent flake-form support, which optionally includes at least one layer of a metal oxide, metal oxide hydrate or mixtures thereof.

Pearlescent pigments consist of transparent flakes of high refractive index and exhibit a characteristic pearlescence due to multiple reflection in the case of parallel orientation. Pearlescent pigments of this type, which additionally also exhibit interference colours, are referred to as interference pigments.

Although classical pearlescent pigments, such as $TiO_2$ flakes, basic lead carbonate, BiOCl pigments or nacreous pigments, are of course also suitable in principle, for the purposes of the invention the transparent interference pigments employed are preferably flake-form interference pigments which have at least one layer of a colourless metal oxide, metal oxide hydrate or mixtures thereof on a colourless flake-form support.

The colourless flake-form support preferably consists of natural or synthetic mica, kaolin or another phyllosilicate, such as talc, kaolin or sericite, glass, calcium aluminium borosilicate, $SiO_2$, $TiO_2$ or $Al_2O_3$.

Particular preference is given to flake-form supports comprising natural or synthetic mica, glass, calcium aluminium borosilicate, $SiO_2$ or $Al_2O_3$.

A layer applied to the support preferably consists of colourless metal oxides and/or metal oxide hydrates thereof, where the metal oxides are selected from $TiO_2$, $SnO_2$, $SiO_2$, $Al_2O_3$, $ZrO_2$, ZnO or mixtures of two or more thereof.

It goes without saying here that the colourless support material and the layer located directly on the support do not consist of the same material.

The interference pigments employed are therefore preferably pigments that have a colourless, transparent, flake-form support comprising natural or synthetic mica, talc, kaolin, sericite, glass, calcium aluminium silicate, $SiO_2$, $Al_2O_3$ or $TiO_2$, where the flake-form support is coated with at least one colourless metal oxide layer and the metal oxides are selected from the group consisting of $TiO_2$, $SnO_2$, $SiO_2$, $Al_2O_3$, $ZrO_2$ and ZnO.

The interference pigments can have a multilayered structure, in which a plurality of layers which consist of the above-mentioned colourless, transparent materials and have different refractive indices such that in each case at least two layers of different refractive index are located alternately on the support, where the refractive indices in the individual layers differ from one another by at least 0.1 and preferably by at least 0.3, are located one above the other on the colourless, transparent, flake-form support particle.

Due to the support material used and the type of layers applied, the interference pigments obtained are therefore also colourless.

The particle size of the flake-form interference pigments must be selected specifically for the coating in the display device according to the invention, since flake-form interference pigments having an excessively large particle size may lead to defects in the surface quality of the coating, whereas interference pigments having an excessively small particle size may exhibit an excessive scattering behaviour. The volume-averaged $d_{10}$ value of the particle size of the interference pigments is therefore between 5 μm and 10 μm (i.e. only 10 percent by volume of a loose pigment bed have a particle size smaller than the value indicated), and the volume-averaged $d_{90}$ value of the particle size is between 105 and 180 μm (i.e. 90 percent by volume of a loose pigment bed have a particle size smaller than the value indicated). In particular, interference pigments are selected whose particle size distribution is within a range that can be described by a $d_{10}$ value of 10 µm and a $d_{90}$ value of 105 µm, where the respective specific $d_{10}$ and $d_{90}$ values for an individual pigment can be significantly greater than 10 µm and significantly less than 105 µm. The interference pigments have an aspect ratio (ratio of the average diameter to the average particle thickness) of 2:1 to 1000:1 and in particular of 6:1 to 250:1.

The particle size distribution of interference pigments is usually determined by a laser diffraction method. Various instruments are commercially available for this purpose. The particle size distribution of the interference pigments employed in the coating of the display device according to the invention is determined here by the laser diffraction method using a Malvern Mastersizer 3000 instrument from Malvern Panalytical (UK).

Flake-form effect pigments which can be employed are, for example, commercially available interference pigments which are available from Merck KGaA under the names Iriodin®, Pyrisma®, Colorstream®, Xirallic®, Miraval®, Ronastar®, Biflair®, Lustrepak®, Colorcrypt®, Colorcode® or Securalic® and meet the prerequisites for colourlessness, light transparency and particle size distribution. Interference pigments having a similar structure from other manufacturers are also suitable.

Interference pigments exhibit interference colours in the application medium. These are based on the fact that the interference pigments, due to their flake-form layer structure and the layer materials, are capable of partly transmitting and partly reflecting incident light (in the case of colourless interference pigments, an absorbed component is substantially absent). If interference effects superimpose themselves on one another at the interfaces of the layer structure, selective amplification occurs of wavelengths which determine the shape of the reflection spectrum, which is supplemented by a mirror-inverted transmission spectrum. Some interference pigments may also form a number of reflection and transmission maxima.

Surprisingly, it has now been found that the display device according to the invention is able to achieve particularly high efficiency with respect to the light yield liberated externally in the case of backlighting if the transparent, colourless, flake-form interference pigments employed in the coating are interference pigments which have a transmission maximum in a certain wavelength range of light that is in the same wavelength range as the emission maximum of the corresponding light source. The corresponding wavelength range is not drawn too narrowly here and covers a range of at least 30 up to 100 nm in which the respective maximum is located. This is particularly interesting if light sources emitting coloured light, for example coloured OLEDs, are employed. Here, the light yield, which is expressed in percent of the incident light strength, is increased up to 5 fold compared with white light sources if the respective transmission maximum of the interference pigments is matched to the emission maximum of the light source. This makes it possible, even on use of light sources which emit a low light strength, still to obtain readily perceptible information on the visible side of the display device or alternatively to employ light sources having lower energy consumption.

The interference pigments described above may be present individually or as a mixture of two or more in the coating present in accordance with the invention in the display device, depending on whether the desired interference colour of the coating can be generated using just a single interference pigment or whether a mixture of interference pigments is required. In addition, however, the coating on the transparent substrate in the display device according to the invention also comprises at least one absorption pigment.

Absorption pigments which can be used are all organic or inorganic absorption pigments usually employed in various industrial coating applications, so long as they are in a certain size range. It is known that the interference effects and any gloss and glitter effects of the interference pigments in coatings in which flake-form interference pigments and absorption pigments are employed together are only visible if the effective particle size of the absorption pigments is so low that they are transparent to incident light and the light absorption by the absorption pigments therefore cannot impair the light interference by the interference pigments. The median value of the primary particle size of the absorption pigments which can be employed in the coating is therefore in the range from 10 to 500 nm. Absorption pigment preparations which are suitable for use in the coating of the display device according to the invention are commercially available. Depending on compatibility with the paint system used, systems such as Heucotint® W (Heubach, DE), Heucotint® UN (Heubach, DE), MIPA WBC (Mipa, DE), Standoblue® (Standox GmbH, DE), Standohyd® (Standox GmbH, DE), Vocaflex® (Arichemie, DE), Vocaplast® (Arichemie, DE), for example, or others come into consideration.

Suitable absorption pigments are, for example, isoindolinones, benzimidazoles, quinacridones, Cu phthalocyanines, perylenes, carbon black and/or titanium dioxide, to mention just a few.

Binders which can be employed are all conventional binders and binder systems which appear transparent in the solidified state. It is possible here to draw on all common types of binder which are employed in conventional coating methods (for example brushing, spraying, printing, roller coating, coil coating, curtain coating, etc.). The suitability for water-based and solvent-containing coating compositions does not have a limiting effect either, since both types of binder systems can be employed.

Further additives in the coating which is employed in the display device according to the invention can be fillers, inhibitors, flame retardants, lubricants, rheology aids, dispersants, redispersants, antifoams, flow-control agents, film formers, adhesion promoters, drying accelerators, photoinitiators, etc.

The corresponding compositions for binder systems and additives are known to the person skilled in the art and in some cases are already commercially available as finished products (as unpigmented coating compositions with or without solvents). Depending on the technological, qualitative or equipment requirements of the respective user, it is possible to select the correspondingly suitable coating compositions, whose solids content is retained in the finished coating of the display device according to the invention.

In the coating employed in the display device according to the invention, the total proportion of the sum of colourless, transparent, flake-form interference pigments and absorption pigments is 15 to 40 percent by weight, based on the total weight of the (solid, dry) coating. Since no further colouring constituents are present in the coating, the total proportion of colouring pigments in the coating is also 15 to 40 percent by weight, based on the weight of the coating. This proportion is preferably in each case in the range from 15 to 30 percent by weight, based on the total weight of the coating.

In order to be able to set an optimum ratio of transparency (in the case of backlighting) and opacity (when viewed from the front, without backlighting) in the coating, careful selection of the ratio of transparent, colourless, flake-form interference pigments and absorption pigments in the coating is of particular importance. In accordance with the invention, the ratio of interference pigment(s) to absorption pigment(s) in the coating is therefore 1:1 to 10:1, preferably 1.5:1 to 8:1.

Opacity in a coating will generally correlate with the hiding power that a certain coating (composition) is able to generate on a substrate. Hiding power here denotes the ability of a coating (composition) to hide the background completely, so that colour differences on this background can no longer be perceived visually after application of the coating. In the case of the above-mentioned ratio of flake-form interference pigments to absorption pigments, the high proportion of colourless interference pigments, which, in combination with an at most equal proportion and at least 10% proportion of (transparent) absorption pigments, leads to sufficiently great covering of the background (here of the transparent substrate and the light source integrated therein or arranged below it), so that brightness differences on the non-backlit substrate are virtually imperceptible in daylight, is amazing.

As a measure of the achievable and necessary hiding power, the applicant is using the colour separation $\Delta E^*$ that arises on application of a coating to a standardised black/white background if the application is carried out with the same layer thickness in a coating composition which is identical for both backgrounds and is measured spectrophotometrically at certain illumination and viewing angles. The spectrophotometric measurement is carried out in the $L^*a^*b^*$ colour space system using corresponding commercially available instruments.

The colour separation $\Delta E^*$ is determined here in accordance with the formula:

$$\Delta E^* = \sqrt{(\Delta L^{*2} + \Delta a^{*2} + \Delta b^{*2})}$$

by the corresponding measuring instrument at all illumination and viewing angles.

As a measure of the hiding power of the coating, the patent applicant refers to the colour separation $\Delta E^*$, determined in a full-area coating on a black/white background with a layer thickness of 14±2 μm at an illumination angle of 45° and at a viewing angle of 75°, determined using a BYKMac i (Byk-Gardner) colour measuring instrument in SMC5 mode. If the colour separation determined in this way is <1, colour differences of the background are no longer visually perceptible. The greater the colour separation determined in this manner, the more clearly the visually perceptible colour impression of the coated white background area differs from the colour impression of the coated black background area.

(Specifically, the background materials used are standardised black/white colour cards or metal panels which represent a flat area. Preference is given to the use of metal panels whose black coating has a reflectivity of at most 1% and whose white coating has a reflectivity of at least 80% (ASTM E 1347). For the present invention, Metopac T12G panels from Leneta are used.

Both backgrounds are coated with the same coating composition with a dry film layer thickness of 14±2 μm and using the same application method. For the present invention, a MIPA WBC Base Coat 000 is employed which is pigmented with absorption pigments and interference pigments in the stated mixing ratios and total proportions. The paint is applied to the panels by spray application.)

The patent applicant has determined values in the range from 3 to 35 as the colour separation $\Delta E^*$ that is necessary and sufficient to ensure the desired opacity (when viewed from the front without backlighting) and the desired transparency (in the case of backlighting) of the coating and determined under the above-mentioned conditions. Colour separations $\Delta E^*$ in the range from 5 to 20 are preferably particularly suitable for the coating in the display device according to the invention. It goes without saying that these values apply to coatings whose colour properties are determined solely by transparent, colourless, flake-form interference pigments in combination with absorption pigments in the stated ratios and concentrations, as described above.

The coating on the transparent substrate in the display device according to the invention has a layer thickness (dry layer thickness) in the range from 5 to 60 μm, preferably in the range from 10 to 40 μm. For certain applications, layer thicknesses in the range from 10 to 25 μm are advantageous.

Suitable transparent substrates for the display device according to the invention are, in particular, plastic films, plastic bodies (for example plastic plates), glass sheets, glass bodies, transparent surface layers on light sources, etc. The film- or plate-like substrates, which have a smooth surface per se, can of course be bent or shaped in any conceivable manner, as required by the particular application. The transparent substrates are transparent to the light emitted by the corresponding light source, but have a transparency of at least 30%, preferably at least 50% and in particular at least 80%, in the region of visible wavelengths (400 to 780 nm).

The coating can be applied to the surface of the transparent substrate that represents the visible side of the substrate by means of various application techniques. Preference is given to the use of printing methods, spraying methods, brushing methods, roller coating methods, coil coating methods or curtain coating methods.

A particular advantage of the display device according to the invention consists in that the coating can also be applied to the visible side of the transparent substrate even after the form-fitting integration of the transparent substrate or a prefabricated semifinished product comprising light source and transparent substrate into an object, namely as joint coating of the surface of the object surrounding the display device in a form-fitting manner and the display device itself. It can be ensured here in a single working step that display device and the surface of the object into which the display device is to be integrated have a coloured surface design which is completely uniform in hue, gloss and texture. The display device can thus be arranged in the object containing it completely invisibly under daylight and with the light source switched off. In particular in the case of display devices which are located in automobile parts, for example in the tailgate, this represents a major advantage since the automobile part and the display device do not have to be matched to one another in their respective colour design in a complex manner and the coating can be carried out in a single working step.

The light sources to be employed in the display device according to the invention are light sources which emit white or coloured light and are selected from the group consisting of incandescent lamps, cold-light lamps, warm-light lamps, fibre-optical systems, fluorescent lamps, energy-saving lamps, LEDs, OLEDs, OLECs and displays of electronic devices. The light sources can, if necessary, be arranged individually or in groups on the back of the transparent substrate or integrated into the transparent substrate in the display device according to the invention, where the latter case in most cases involves integration of a transparent substrate into the usual structure of a light source, such as, for example, in the case of a commercially available incandescent lamp or OLED. Preference is given to the use of light sources which can easily be connected to the transparent substrate or adhesively bonded to or printed onto various surfaces of objects without major technical affort. If the light source used is partially or predominantly transparent to light in the inactive state, it has proven advantageous to provide the light source with a light-absorbent background on its back side facing away from the transparent substrate. This background can correspond to the above-mentioned surface of objects to which the light source can, for example, be adhesively bonded, but may also be additionally inserted. A light-absorbent, in particular dark or black, background of this type enhances the visibility of the interference colour of the interference pigments in the coating if the light source does not have sufficiently high light absorption, even in the inactive state.

The more variably the light source or group of light sources employed can be addressed, the more variable the information rendered visible on the visible side by means of the display device according to the invention can be made. This succeeds very well, in particular, if the layer structure of the display device according to the invention does not contain a masking layer and the entire visible area of the display device can therefore be utilised for information transmission.

The visible area of the display device should have a minimum size of 0.25 cm², since below this size easily visible transmission of information by backlighting does not appear useful. An upper limit to the area size of the visible side is only given by technical limits associated with production. Display devices having an area size of several square metres are entirely conceivable and also necessary for various applications.

The present invention also relates to a process for the production of a display device as described above, in which a surface which forms a visible side of a transparent substrate, where a light source has optionally been integrated into the substrate and where the surface has optionally been pre-coated with a masking layer which is partly transparent to light and partly opaque to light, is coated with a coating composition which comprises at least one transparent binder, at least one colourless, transparent, flake-form interference pigment, at least one absorption pigment and optionally further additives, where interference pigment(s) and absorption pigment(s) are present in the coating composition in a ratio of 1:1 to 10:1, the coating composition is subsequently solidified, and, in the case where the substrate does not contain a light source, a light source is arranged on the back of the transparent substrate.

The coating produced here has a ΔE* value in the L*a*b* colour space system between the coated black background and the coated white background in the range from 3 to 35, preferably from 5 to 20, when applied to the entire area of a black/white background in a layer thickness of 14±2 μm and measured spectrophotometrically at an illumination angle of 45° and a viewing angle of 75°.

It is of particular importance for the present invention that the coating composition, which may optionally comprise water and/or organic solvents, comprises no further colouring ingredients apart from the colourless, transparent, flake-form interference pigment (or mixtures of a plurality thereof) and the absorption pigment (or mixtures of a plurality thereof).

After solidification, the coating should have a layer thickness in the range from 5 to 60 μm.

If the coating is applied merely to a first part-area of the surface of the two-dimensional, light-transparent substrate that represents the visible side of the display device, which is supplemented by a second part-area, so that the first and second part-areas form the entire surface of the two-dimensional, light-transparent substrate that represents the visible side of the display device, the shape of the first part-area itself represents information or is suitable for the transmission of information, and the second part-area has a layer which is opaque to light, which here fulfils the function of a masking layer. In this case, the surface of the two-dimensional, light-transparent substrate which represents the visible side of the display device is not pre-coated with a masking layer.

Details with respect to the type, size and concentration of the pigments used in the coating composition have already been described above. To this extent, reference is made thereto at this point.

The coating composition can be applied to the transparent substrate by means of various conventional coating methods. Mention may be made here, in particular, of printing methods, spraying methods, brushing methods, roller coating methods, coil coating methods or curtain coating methods.

In a particularly preferred embodiment of the invention, the coating composition is a paint, in particular an automotive paint. As base coat, this is applied to the transparent substrate in a dry layer thickness in the range from 10 to 25 μm. In the case of one-layer systems, the layer thickness can also be in the range from 5 to 60 μm.

It goes without saying that the surface of the coating which represents the visible side of the display device can, if necessary, also be provided with one or more protective layers which has or have high light transparency, at least in the visible wavelength region of solar radiation, but offers or offer, for example, protection against UV light and/or mechanical stresses.

The present invention also relates to the use of the display device described above as static or variable backlit information display for internal and/or external components of motor vehicles, for domestic appliances, electronic devices, architectural elements, advertising areas, information panels, direction signs, furniture, decoration elements for the interior and exterior design of buildings and for objects of art.

Owing to the ease of production and the low number of components, the display device according to the invention can be employed in many different areas of industry and public life. As already described above, the application of the coating, which only comprises a few colouring constituents and can be applied to various types of substrate using conventional methods, can also be delayed until after any installation of the transparent substrates or of the transparent substrates connected to the light source into the corresponding application objects. This fully guarantees optical correspondence of the visible area of the display device with the visible area of the object surrounding it with the backlighting inactive. Since it is also possible to use a multiplicity of different light sources, display devices which are technically very simple or also more complicated structures with individually or variably addressable light sources can be produced. The display device can optionally be fitted or not fitted with masking layers and is therefore suitable both for the transmission of information fixed in advance and for the variable transmission of any desired information.

If the display device according to the invention is a variable information display, the type of information, the duration and frequency of the emission of the information and the light strength of the information can be controlled by an electronic program. This gives rise to a large band width of possible uses with individually selectable area dimensions of the display device in a very broad range.

Figure 3:
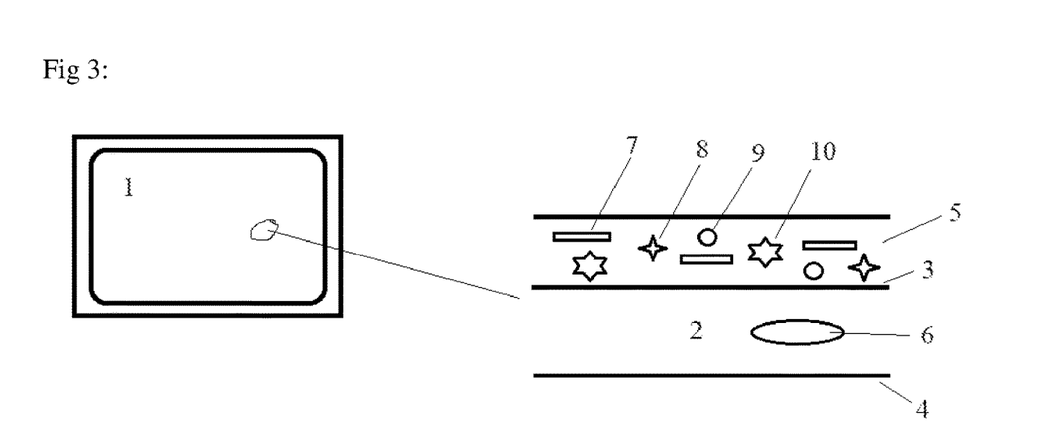

FIG. 3: shows a display. The display device (1) contains a transparent substrate (2) having a visible side (3) and a back side (41, a coating (5) on the visible side of the transparent substrate and a light source (6) which is integrated into the transparent substr anged on the back of the tra sparent subs ale, where the coating comprises at least one ST binder (10), at least one colourless, isparent.

Dlake form interference pigment (7) and at least one absorption pigment (8) and optionally further additives (9).

The present invention is intended to be explained in greater detail below with reference to examples, but not reduced thereto.

EXAMPLE 1

Coloured paints (A) (B) and (C) having the following composition are prepared:

| (A): | MIPA WBC Base Coat 000 (Mipa SE, DE) | 72% of dry matter |
| --- | --- | --- |
| | Colouring components | 28% of dry matter |
| | of which: turquoise interference pigment $TiO_2$ on mica (Pyrisma ® T40-25 Color Space Turquoise SW (Merck KGaA); | about. 85% by weight |
| | blue pigment Color Index P.B. 15:2 | about 14% by weight |
| | blue pigment Color Index P.B. 15:4 | about 1% by weight |
| (B): | MIPA WBC Base Coat 000 | 72% of dry matter |
| | Colouring components | 28% of dry matter |
| | of which: blue interference pigment $TiO_2$ on mica (Pyrisma ® T40-23 Color Space Blue SW Merck KGaA); | about 85% by weight |
| | blue pigment Color Index P.B. 15:2 | about 14% by weight |
| | blue pigment Color Index P.B. 15:4 | about 1% by weight |
| (C): | MIPA WBC Base Coat 000 | 72% of dry matter |
| | Colouring components | 28% of dry matter |
| | of which: red interference pigment $TiO_2$ on mica (Pyrisma ® T40-21 Color Space Red SW Merck KGaA); | about 85% by weight |
| | blue pigment Color Index P.B. 15:2 | about 14% by weight |
| | blue pigment Color Index P.B. 15:4 | about 1% by weight |

The absorption pigments are employed in the form of commercially available pigment concentrates The coloured paints are in each case applied to black/white-painted test panels (Metopac T21G; Leneta) in a dry layer thickness of about 14 μm with the aid of a spray device and allowed to solidify. The colour separation ΔE* is measured using a BYKMac i colour measurement instrument in SMC5 mode without measurement stage. In each case, the L*,a*,b* values are measured at an angle of incidence of 45° and a viewing angle of 75°, and the colour separation of the coating over the white background and over the black background is determined for each paint composition.

The colour separation ΔE* for paint composition (A) is 16,
the colour separation ΔE* for paint composition (B) is 26 and
the colour separation ΔE* for paint composition (C) is 20.

EXAMPLE 2

The paint compositions prepared in Example 1 are in each case applied to the entire surface of transparent plastic plates (polycarbonate, Makrolon® UV, 3 mm thick) in a dry layer thickness of about 14 μm and allowed to solidify. As comparison, an uncoated plastic plate is used. The plastic plates are in each case fixed above a white cold-light lamp (about 5490 K) in such a way that the painted side faces away from the light source and forms the visible side. The light yield arriving on the visible side with the light source switched on is determined using a GL Spectis 5.0 Touch optical spectrometer (GL Optic Lichtmesstechnik GmbH, DE).

The photometric irradiation strength in the wavelength range from 200 to 1050 nm is about 800 lux (lx) for paint composition (A), about 590 lx for paint composition (B) and about 930 lx for paint composition (C). The photometric irradiation strength for the uncoated plastic plate is about 13500 lx.

For paint composition (A), a residual irradiation strength (irradiation strength coated/irradiation strength uncoated *100, in %) of about 5.8% can be determined, compared with a residual irradiation strength of 100% for the uncoated plastic plate. A corresponding residual irradiation strength of about 4.3% arises for paint composition (B) and a residual irradiation strength of about 7% arises for paint composition (C).

EXAMPLE 3

Paint composition (A) is applied directly to the transparent surface of a blue-emitting OLED W1832 in a dry layer thickness of about 14 μm and allowed to solidify. As comparison, an uncoated blue-emitting OLED W1832 is used.

Figure 1:
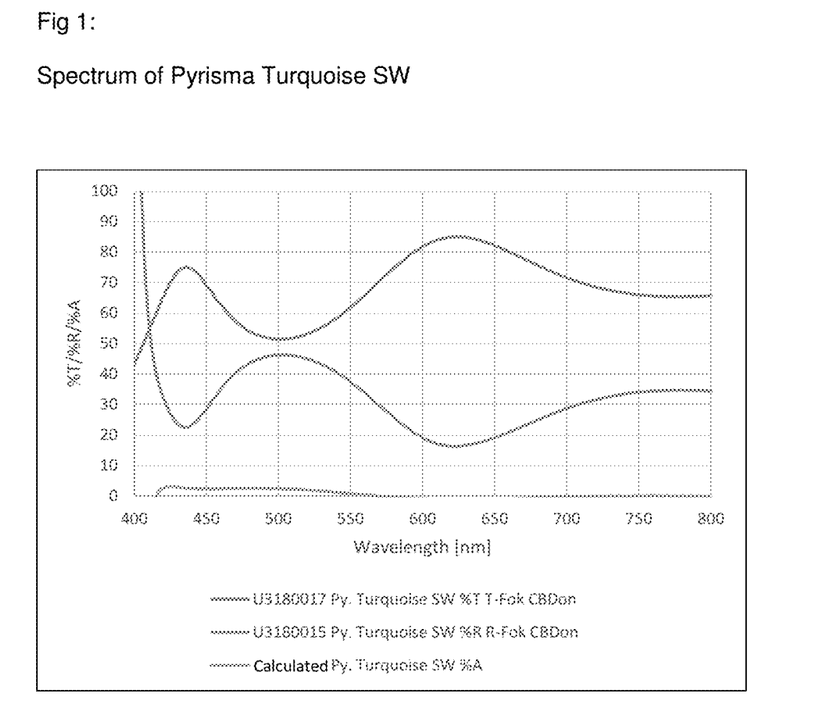
FIG. 1: shows the transmission, reflection and absorption spectrum of the pigment Pyrisma Turquoise SW.

The turquoise interference pigment has the transmission, reflection and absorption behaviour depicted in FIG. 1. A transmission maximum is evident in the wavelength range from 420 to 460 nm.

Figure 2:
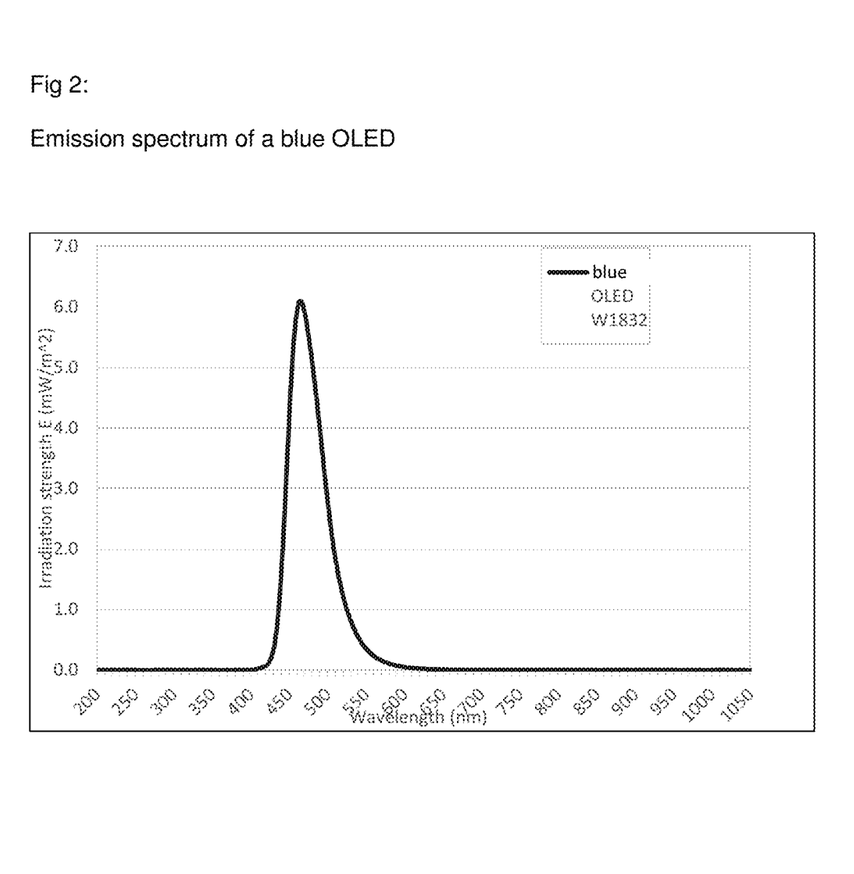
FIG. 2: shows the emission spectrum of a blue OLED W1832.

The OLED W1832 used in Example 3 has the emission spectrum depicted in FIG. 2. An emission maximum is evident in the wavelength range from 450 to 480 nm.

The uncoated OLED has a photometric irradiation strength of about 52 lx. The OLED W1832 coated with paint composition (A) still achieves a photometric irradiation strength of about 15 lx, which corresponds to a residual irradiation strength of about 28%, compared with a residual irradiation strength of 100% for the uncoated OLED. In comparison with Example 2, a clearly higher percentage residual light yield in relation to the uncoated substrate arises if a light source is used whose emission maximum is in the same wavelength range as the transmission maximum of the interference pigment used in the coating.

The invention claimed is:

1. A display device comprising a transparent substrate having a visible side and a back side, a coating on the visible side of the transparent substrate and a light source which is integrated into the transparent substrate or arranged on the back of the transparent substrate, where the coating comprises at least one transparent binder, at least one colourless, transparent, flake-form interference pigment and at least one absorption pigment and optionally further additives, and where the coating has a colour separation ΔE* of 3 to 35, which ΔE* is measured by applying the coating over the entire area of a black/white background in a layer thickness of 14±2 μm and measured spectrophotometrically at an illumination angle of 45° and at a viewing angle of 75°, wherein said colour separation ΔE* of 3 to 35 is between the coated black background and the coated white background.

2. The display device according to claim 1, wherein the interference pigment(s) and absorption pigment(s) are present in the coating in a ratio of 1:1 to 10:1.

3. The display device according to claim 2, wherein the ratio of interference pigment(s) to absorption pigment(s) in the coating is 1.5:1 to 8:1.

4. The display device according to claim 1, wherein the colourless, transparent, flake-form interference pigment is a pigment which has a colourless, transparent, flake-form support selected from natural or synthetic mica, talc, kaolin, sericite, $SiO_2$, $Al_2O_3$, $TiO_2$ or glass, where the flake-form support is coated with at least one colourless metal oxide layer and the metal oxides are selected from the group consisting of $SiO_2$, $Al_2O_3$, $TiO_2$, $ZrO_2$, $SnO_2$ and ZnO.

5. The display device according to claim 1, wherein the colourless, transparent, flake-form interference pigment has a volume-weighted $d_{10}$ value of the particle size of >5 μm to 10 μm and a volume-weighted $d_{90}$ value of the particle size of 105 to 180 μm.

6. The display device according to claim 1, wherein the absorption pigment is at least one inorganic or organic absorption pigment having a median value of the primary particle size of 10 nm to 500 nm.

7. The display device according to claim 1, wherein the coating comprises no further colouring ingredients apart from the at least one colourless, transparent, flake-form interference pigment and the at least one absorption pigment.

8. The display device according to claim 1, wherein the at least one colourless, transparent interference pigment and the at least one absorption pigment together have a proportion of 15 to 40% by weight, based on the total weight of the coating.

9. The display device according to claim 1, wherein the transparent substrate is a plastic film, a plastic body, a glass sheet, a glass body or a transparent layer on a light source.

10. The display device according to claim 1, wherein the coating has been applied directly to a substrate surface forming the visible side of the transparent substrate.

11. The display device according to claim 10, wherein the coating has been applied to the entire area of the substrate surface forming the visible side of the transparent substrate.

12. The display device according to claim 10, wherein the substrate surface forming the visible side of the transparent substrate has first and second part-areas, where the coating has been applied to the first part-area and the first part-area has a shape which represents information, and where the second part-area has been provided with a masking layer that is opaque to light.

13. The display device according to claim 1, wherein the light source is arranged on the back of the transparent substrate and a masking layer, which is partly transparent to light and partly opaque to light, is arranged between the light source and the transparent substrate.

14. The display device according to claim 1, wherein a masking layer which is partly transparent to light and partly opaque to light is arranged between a substrate surface forming the visible side of the transparent substrate and the coating.

15. The display device according to claim 1, wherein the coating has a layer thickness of 5 to 60 μm.

16. The display device according to claim 1, wherein the light source is a light source emitting white or coloured light, and is selected from the group consisting of incandescent lamps, cold-light lamps, warm-light lamps, fibre-optical systems, fluorescent lamps, energy-saving lamps, LEDs, OLEDs, OLECs and displays of electronic devices.

17. The display device according to claim 1, wherein the light source has an emission maximum in a certain wavelength range of light and the colourless, transparent, flake-form interference pigment has a transmission maximum in a certain wavelength range of light and in that the emission maximum of the light source and the transmission maximum of the interference pigment are in the same wavelength range of light.

18. The display device according to claim 1, wherein the display device as part of an object is integrated into the latter in a form-fitting manner and the visible side of the transparent substrate which is provided with the coating forms a common surface with the object, where the common surface has uniform colour, gloss and/or texture effects when the light source is switched off.

19. A process for the production of a display device according to claim 1, comprising coating a surface which forms a visible side of a two-dimensional transparent substrate with a coating composition which comprises at least one transparent binder, at least one colourless, transparent, flake-form interference pigment, at least one absorption pigment and optionally further additives, and subsequently solidifying the coating composition,
where interference pigment(s) and absorption pigment(s) are present in the coating composition in a ratio of 1:1 to 10:1,
where a light source has either been integrated into the substrate or has been arranged on the back of the transparent substrate,
where the surface has optionally been pre-coated with a masking layer which is partly transparent to light and partly opaque to lights, and
where the coating has a colour separation ΔE* of 3 to 35, which ΔE* is measured by applying the coating over the entire area of a black/white background in a layer thickness of 14±2 μm and measured spectrophotometrically at an Illumination angle of 45° and at a viewing angle of 75°, wherein said colour separation ΔE* of 3 to 35 is between the coated black background and the coated white background.

20. The process according to claim 19, wherein the coating composition is applied to the entire area of the two-dimensional transparent substrate.

21. The process according to claim 19, wherein the surface of the two-dimensional transparent substrate has not been pre-coated with a masking layer and the coating composition is applied to a first part-area of the surface of the two-dimensional transparent substrate, which has a shape which represents information, and where a second part-area of the surface of the two-dimensional transparent substrate which supplements the first part-area is provided with a masking layer that is opaque to light, so that the entire surface of the two-dimensional transparent substrate is coated.

22. A process for the production of a display device according to claim 1, comprising coating a surface which forms a visible side of a two dimensional transparent substrate with a coating composition which comprises at least one transparent binder, at least one colorless transparent fluke-form interference pigment, at least one absorption pigment and optionally further additives and subsequently solidifying the coating composition,
- where interference pigment(s) and absorption pigment(s) are present in the coating composition in a ratio of 1.1 to 10.1,
- where a light source has either been integrated into the substance or has been arranged on the back of the transparent substrate,
- where the surface has optionally been pre-coated with a masking layer which is partly transparent to light and partly opaque to light, and
- where the coating has a colour separation $\Delta E^*$ of 3 to 35, which $\Delta E^*$ is measured by applying the coating over the entire area of a black/white background in a layer thickness of 14±2 µm and measured spectrophotometrically at an illumination angle of 45° and at a viewing angle of 75°, wherein said colour separation $\Delta E^*$ of 3 to 35 is between the coated black background and the coated white background, and
- wherein the coating composition comprises no further colouring ingredients apart from the at least one colourless, transparent, flake-form interference pigment and the at least one absorption pigment.

23. The process according to claim 19, wherein a coating is obtained which, after solidification, has a dry layer thickness of 5 to 60 µm.

24. The process according to claim 19, wherein the coating composition is an automotive paint.

25. A static or variable, backlit information display for interior and/or exterior components of motor vehicles, for domestic appliances, electronic devices, architectural elements, advertising areas, information panels, direction signs, furniture, decoration elements for the interior and/or exterior design of buildings or for objects of art, comprising the display device according to claim 1.

26. The static or variable, backlit information display for interior and/or exterior components of motor vehicles, for domestic appliances, electronic devices, architectural elements, advertising areas, information panels, direction signs, furniture, decoration elements for the interior and/or exterior design of buildings or for objects of art according to claim 25, wherein the display is a variable information display and the type of information, the duration and frequency of the emission of the information or the light strength of the information is controlled by an electronic program.

* * * * *